US011355952B2

(12) United States Patent
Youn et al.

(10) Patent No.: US 11,355,952 B2
(45) Date of Patent: Jun. 7, 2022

(54) APPARATUS AND METHOD FOR CONTROLLING POWER PLANT SYSTEM

(71) Applicants: DOOSAN HEAVY INDUSTRIES & CONSTRUCTION CO., LTD., Changwon (KR); KOREA WESTERN POWER CO., LTD.

(72) Inventors: Ju Young Youn, Yongin (KR); Jwa Young Maeng, Yongin (KR); Young Hoon Rhie, Yongin (KR); In Young Chung, Taen-gun (KR); Jin Gon Lim, Taen-gun (KR)

(*) Notice: Subject to any disclaimer, the term of this patent is extended or adjusted under 35 U.S.C. 154(b) by 0 days.

(21) Appl. No.: 17/137,966

(22) Filed: Dec. 30, 2020

(65) Prior Publication Data
US 2021/0210974 A1 Jul. 8, 2021

(30) Foreign Application Priority Data
Jan. 3, 2020 (KR) .......................... 10-2020-0000628

(51) Int. Cl.
*H02J 9/04* (2006.01)
*H02J 7/00* (2006.01)
(52) U.S. Cl.
CPC ............ *H02J 9/04* (2013.01); *H02J 7/00712* (2020.01)

(58) Field of Classification Search
CPC ................................ H02J 9/04; H02J 7/00712
See application file for complete search history.

(56) References Cited

U.S. PATENT DOCUMENTS 7,355,297 B2 * 4/2008 Andrew .................. F01D 15/10
290/2
7,839,027 B2 * 11/2010 Shelton .................. H02J 7/0048
307/102

* cited by examiner

*Primary Examiner* — Carlos Amaya
(74) *Attorney, Agent, or Firm* — Harvest IP Law, LLP

(57) ABSTRACT

A control device for a power generation system comprising an energy storage system (ESS) and a power plant is provided. The control device includes: a controller configured to compare a supply frequency of a supply power supplied to a consumer with a reference frequency, compare a charge amount of the ESS with a reference charge amount, and control the ESS and the power plant such that the supply power is controlled according to a result of the frequency comparison and a result of the charge amount comparison, an opening degree control device configured to control an opening degree of a steam valve disposed in the power plant by the control of the controller, and a fuel quantity control device configured to control a quantity of fuel injected into the power plant for power generation by the control of the controller.

20 Claims, 4 Drawing Sheets

APPARATUS AND METHOD FOR CONTROLLING POWER PLANT SYSTEM

CROSS-REFERENCE TO RELATED APPLICATION

This application claims priority to Korean Patent Application No. 10-2020-0000628, filed Jan. 3, 2020, the disclosure of which is incorporated by reference herein in its entirety.

BACKGROUND

Field

Apparatuses and methods consistent with exemplary embodiments relate to an apparatus and a method for controlling power plant system, and more particularly, to an apparatus and a method for controlling an amount of power supplied to a consumer when a frequency of the power is less than a reference frequency and when a charge amount of an energy storage system (ESS) is less than or equal to a reference charge amount.

Description of the Related Art

An energy storage system (ESS) stores excess power generated by a power plant or renewable energy generated irregularly and temporarily transmits when power is insufficient.

In solar power generation as a new renewable energy which is rapidly growing in recent years, ESS is becoming more important as an essential device for storing unstable power generation energy and stably supplying it to a power system when necessary.

The ESS is installed and used in power generation, power transmission and distribution, and consumers in the power system, and is used to control frequency using renewable energy and to stabilize generator output.

However, if a battery is overcharged or over-discharged, ESS can no longer control the frequency. If the ESS cannot perform the frequency control function, the frequency control of the consumer is impossible, and the ESS may remain abnormal for a long time.

SUMMARY

Aspects of one or more exemplary embodiments provide a frequency control apparatus which, when a frequency of power supplied to a consumer is less than a reference frequency and when a charge amount of an energy storage system (ESS) is less than or equal to a reference charge amount, increases an amount of power supplied to the consumer by controlling at least one of an opening degree of a steam valve and a fuel quantity, thereby increasing the frequency, and a controlling method thereof.

Aspects of one or more exemplary embodiments also provide an apparatus and a method for controlling a power plant system which, when a frequency of power supplied to a consumer is less than a reference frequency and when a charge amount of ESS associated with the power plant is less than or equal to a reference charge amount, increases an amount of power supplied to the consumer by controlling at least one of an opening degree of a steam valve and a fuel quantity, thereby increasing the frequency.

Additional aspects will be set forth in part in the description which follows and, in part, will become apparent from the description, or may be learned by practice of the exemplary embodiments.

According to an aspect of an exemplary embodiment, there is provided a control method of a power generation system including an energy storage system (ESS) and a power plant, the control method including: comparing a supply frequency of a supply power supplied to a consumer with a reference frequency; and controlling the supply power in accordance with a result of the frequency comparison, wherein the controlling the supply power may include comparing a charge amount of the ESS with a reference charge amount and controlling an output of the power plant in accordance with a result of the charge amount comparison. The controlling the output of the power plant may include controlling at least one of a steam valve disposed in the power plant and a quantity of fuel injected into the power plant.

The controlling the supply power may include decreasing an amount of power supplied to the consumer, in response to determining that the supply frequency is greater than the reference frequency.

The controlling the output of the power plant and the discharge amount of the ESS may include controlling the output of the power plant to be reduced, in response to determining that the charge amount of the ESS is greater than the reference charge amount.

The controlling the output of the power plant and the discharge amount of the ESS may include controlling the ESS to be charged by using the output of the power plant, in response to determining that the charge amount of the ESS is less than or equal to the reference charge amount.

The controlling the supply power may include increasing an amount of power supplied to the consumer, in response to determining that the supply frequency is less than the reference frequency.

The controlling the output of the power plant and the discharge amount of the ESS may include controlling power of at least one of the output of the power plant and the discharge amount of the ESS to be increased, in response to determining that the charge amount of the ESS is greater than the reference charge amount.

The controlling the output of the power plant and the discharge amount of the ESS may include controlling the output of the power plant to be increased and controlling the discharge amount of the ESS to be 0, in response to determining that the charge amount of the ESS is less than or equal to the reference charge amount.

The controlling the output of the power plant to be increased may include controlling an opening degree of the steam valve to be increased or controlling the quantity of fuel to be increased.

According to an aspect of another exemplary embodiment, there is provided a control device for a power generation system including an energy storage system (ESS) and a power plant, the control device including: a controller configured to compare a supply frequency of supply power supplied to a consumer with a reference frequency, compare a charge amount of the ESS with a reference charge amount, and control the ESS and the power plant such that the supply power is controlled according to a result of the frequency comparison and a result of the charge amount comparison; an opening degree control device configured to control an opening degree of a steam valve disposed in the power plant by the control of the controller; and a fuel quantity control device configured to control a quantity of fuel injected to the power plant for power generation by the control of the controller.

The controller may control the ESS and the power plant to reduce an amount of power supplied to the consumer, in response to determining that the supply frequency is greater than the reference frequency.

The controller may control an output of the power plant to be reduced, in response to determining that the charge amount of the ESS is greater than the reference charge amount.

The controller may control the ESS to be charged by using an output of the power plant, in response to determining that the charge amount of the ESS is less than or equal to the reference charge amount.

The controller may control the ESS and the power plant to increase an amount of power supplied to the consumer, in response to determining that the supply frequency is less than the reference frequency.

The controller may control power of at least one of an output of the power plant and a discharge amount of the ESS to increase, in response to determining that the charge amount of the ESS is greater than the reference charge amount.

The controller may control an output of the power plant to increase and controls a discharge amount of the ESS to be 0, in response to determining that the charge amount of the ESS is less than or equal to the reference charge amount.

The controller may control the opening degree control device to increase the opening degree of the steam valve or controls the fuel quantity control device to increase the quantity of fuel.

According to an aspect of another exemplary embodiment, there is provided a control device for a frequency control system including: an energy storage system (ESS); a power plant configured to generate a supply power supplied to a consumer; a processor configured to: compare a supply frequency of the supply power supplied to the consumer with a reference frequency; compare a charge amount of the ESS with a reference charge amount; and control the ESS and the power plant to output power based on a frequency comparison result and a charge amount comparison result.

The processor may control the ESS and the power plant to reduce an amount of power supplied to the consumer by transmitting control signals for controlling the amount of power to the ESS and the power plant, respectively, in response to determining that the supply frequency is greater than the reference frequency.

The processor may control the ESS and the power plant to increase an amount of power supplied to the consumer by transmitting control signals for controlling the amount of power to the ESS and the power plant, respectively, in response to determining that the supply frequency is less than the reference frequency.

The processor may control the power plant to increase an amount of power supplied to the consumer and control the ESS to be charged using an output of the power plant, in response to determining that the charge amount of the ESS is less than or equal to the reference charge amount.

A control device of a power generation system and a method of the same according to the exemplary embodiments can control a frequency of a consumer through the power generated by the power plant even when the battery of the ESS is overcharged or over-discharged.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
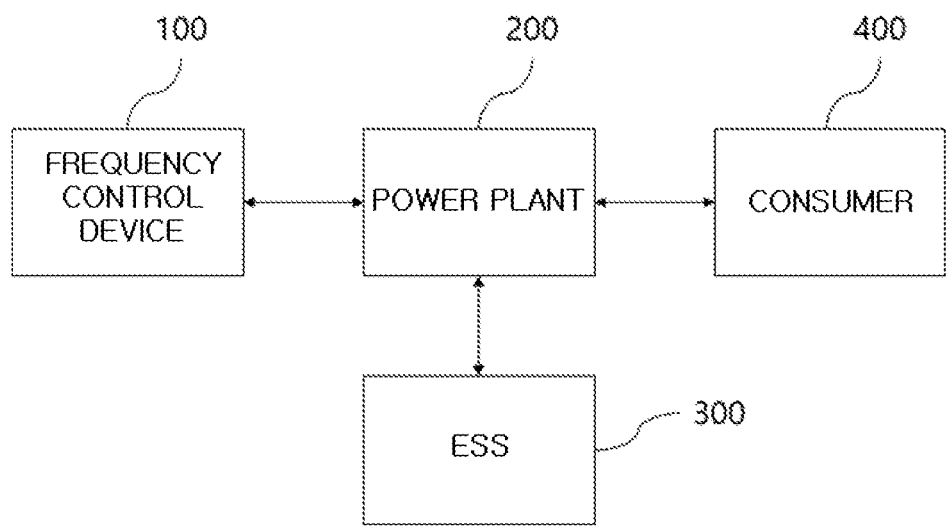
FIG. 1 is a view showing a configuration of a frequency control system according to an exemplary embodiment.

Various changes and various exemplary embodiments will be described in detail with reference to the accompanying drawings so that those skilled in the art can easily carry out the disclosure. It should be understood, however, that the various embodiments are not for limiting the scope of the disclosure to the particular disclosed forms, but they should be interpreted to include all modifications, equivalents, and alternatives of the embodiments included within the sprit and technical scope disclosed herein.

The functional blocks illustrated in the drawings and described below are only examples of possible implementations. Other functional blocks may be used in other implementations without departing from the spirit and scope of the detailed description. Also, while one or more functional blocks of the present disclosure are represented by separate blocks, one or more of the functional blocks may be a combination of various hardware and software configurations that perform the same function.

Also, "a module," "a unit," or "a part" in the disclosure performs at least one function or operation, and these elements may be implemented as hardware, such as a processor or integrated circuit, software that is executed by a processor, or a combination thereof. Further, a plurality of "modules," a plurality of "units," or a plurality of "parts" may be integrated into at least one module or chip and may be implemented as at least one processor except for "modules," "units" or "parts" that should be implemented in a specific hardware.

The terms used in the exemplary embodiments are for the purpose of describing specific exemplary embodiments only, and are not intended to limit the scope of the disclosure. The singular forms "a", "an", and "the" are intended to include the plural forms as well unless the context clearly indicates otherwise. In the disclosure, terms such as "comprises," "includes," or "have/has" should be construed as designating that there are such features, integers, steps, operations, components, parts and/or a combination thereof, not to exclude the presence or possibility of adding of one or more other features, integers, steps, operations, components, parts and/or a combination thereof.

Unless otherwise defined, all terms used herein including technical and scientific terms have the same meaning as commonly understood by one of ordinary skill in the art to which the present invention belongs. Commonly used terms defined in the dictionary are additionally construed as having meanings conforming to related technology documents and currently disclosed contents. As long as terms are not clearly defined, the terms should not be ideally or excessively construed as formal meaning.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

Hereafter, exemplary embodiments will be described in detail with reference to the accompanying drawings. In order to clearly illustrate the disclosure in the drawings, some of the elements that are not essential to the complete understanding of the disclosure may be omitted, and like reference numerals refer to like elements throughout the specification.

FIG. 1 is a view showing a configuration of a frequency control system according to an exemplary embodiment.

Referring to FIG. 1, a frequency adjustment system 1000 according to the exemplary embodiment may include a frequency control device 100, a power plant 200, an energy storage system (ESS) 300, and a consumer 400.

The power plant 200 may generate and supply power to the consumer 400. The ESS 300 may store renewable energy and temporarily supply the power to the consumer 400 when power is insufficient.

The frequency control device 100 may control an amount of power supplied to the consumer 400 based on a supply frequency of the power supplied from the power plant 200 to the consumer 400. For example, the frequency control device 100 may compare the supply frequency of the power supplied to the consumer 400 with a reference frequency. Here, the reference frequency may be 50 Hz to 60 Hz. As a result of comparing the supply frequency and the reference frequency, if the supply frequency is greater than the reference frequency, the frequency control device 100 may determine that the power supply is greater than the power demand, and if the supply frequency is less than the reference frequency, the frequency control device 100 may determine that the power demand is greater than the power supply.

If the supply frequency is greater than the reference frequency, the power supply is greater than the power demand. Therefore, the frequency control device 100 may decrease an amount of power supplied to the consumer 400 from the power plant 200 and the ESS 300. Also, if the supply frequency is less than the reference frequency, the power demand is greater than the power supply. Therefore, the frequency control device 100 may increase the amount of power supplied to the consumer 400 from the power plant 200 and the ESS 300.

However, if the supply frequency is less than the reference frequency and the amount of power supplied from the power plant 200 and the ESS 300 to the consumer 400 increases, a charge amount of the ESS 300 is small and it cannot supply power to the consumer 400. In this case, the consumer 400 cannot be supplied with sufficient power, and thus the supply frequency supplied to the consumer 400 may not be increased. As a result, a power outage may occur in the consumer 400.

To solve this, the frequency control device 100 may control the supply frequency supplied to the consumer 400 by controlling the amount of power generated by the power plant 200 in accordance with the amount of charge of the ESS 300.

Figure 2:
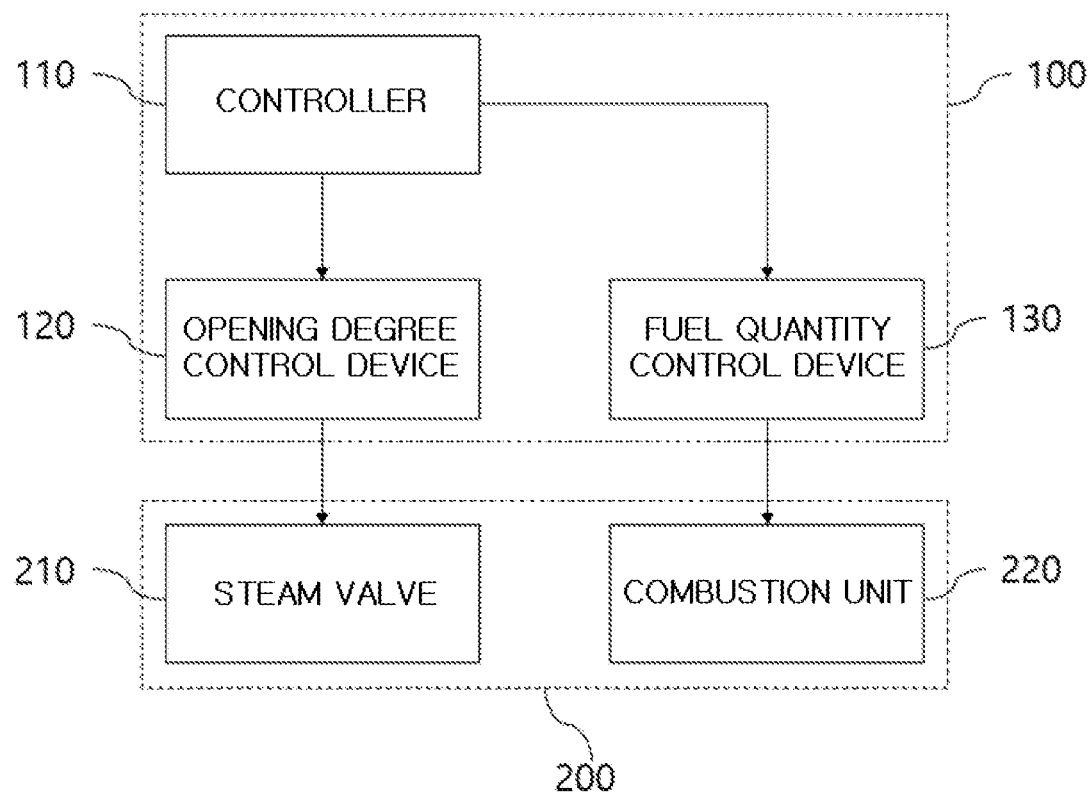
FIG. 2 is a view showing a configuration of a frequency control device according to an exemplary embodiment.

FIG. 2 is a view showing a configuration of the frequency control device 100 according to the exemplary embodiment.

Referring to FIG. 2, the frequency control device 100 may include a controller 110, an opening degree control device 120, and a fuel quantity control device 130.

The controller 110 may control an amount of power supplied to the consumer based on the supply frequency of the supply power supplied to the consumer and the charge amount of the ESS 300.

The controller 110 may compare the supply frequency of the power supplied to the consumer and the reference frequency. As a result of comparing the supply frequency and the reference frequency, if the supply frequency is greater than the reference frequency, the controller 110 may control the power plant 200 to decrease the amount of power supplied to the consumer 400. If the supply frequency is less than the reference frequency, the controller 110 may control the power plant 200 to increase the amount of power supplied to the consumer 400.

For example, the controller 110 may control the amount of power generated by the power plant 200 to decrease in order to reduce the amount of power supplied to the consumer 400. Also, the controller 110 may store a part of the power generated by the power plant 200 in the ESS 300 to reduce the amount of power supplied to the consumer 400.

For example, the controller 110 may control to increase the amount of power generated by the power plant 200 in order to increase the amount of power supplied to the consumer 400. In addition, the controller 110 may control the power plant 200 to receive power stored in the ESS 300 and supply it to the consumer 400 in order to increase the amount of power supplied to the consumer 400.

However, if the charge amount of the ESS 300 is less than or equal to a reference charge amount, the power stored in the ESS 300 cannot be supplied to the consumer 400, and the supply frequency of the power to be supplied to the consumer 400 cannot be increased. Accordingly, if the charge amount of the ESS 300 is less than or equal to the reference charge amount, the controller 110 may increase the supply frequency supplied to the consumer 400 by increasing the amount of power generated by the power plant 200.

For example, if the supply frequency is less than the reference frequency and the charge amount of the ESS 300 is less than or equal to the reference charge amount, the controller 110 controls at least one of the opening degree control device 120 and the fuel quantity control device 130 to increase the amount of power supplied to the consumer 400.

The controller 110 may control the opening degree control device 120 to control an opening degree of a steam valve 210 installed in the power plant 200.

The opening degree control device 120 may control the opening degree of the steam valve 210 to be reduced by the control of the controller 110. Here, if the opening degree of the steam valve is reduced by the opening degree control device 120, the flow velocity of the steam may be temporarily increased. Accordingly, it is possible to increase the amount of power generated by the power plant 200 by temporarily increasing the amount of steam. As the amount of power generated by the power plant 200 increases, more power may be supplied to the consumer 400. Accordingly, the supply frequency of the power to be supplied to the consumer 400 may be increased.

Further, the controller 110 may control the fuel quantity control device 130 to control a quantity of fuel injected into the power plant 200 for power generation.

The fuel quantity control device 130 may increase the quantity of fuel injected into the power plant 200 by the control of the controller 110. Here, if the quantity of fuel is increased by the fuel quantity control device 130, the quantity of fuel burned in a combustion unit 220 increases, thereby increasing the amount of power generated by the power plant 200.

If the amount of power generated by the power plant 200 is increased by the control of the controller 110, more power may be supplied to the consumer 400. Accordingly, the supply frequency of the power supplied to the consumer 400 may increase.

That is, if the charge amount of the ESS 300 is less than or equal to the reference charge amount, the controller 110 may control the supply frequency of the power supplied to the consumer 400 by increasing the amount of power generated by the power plant 200. If the charge amount of the ESS 300 exceeds the reference charge amount, the controller 110 may control the power plant 200 and the ESS 300 to supply power to the consumer 400.

Figure 3:
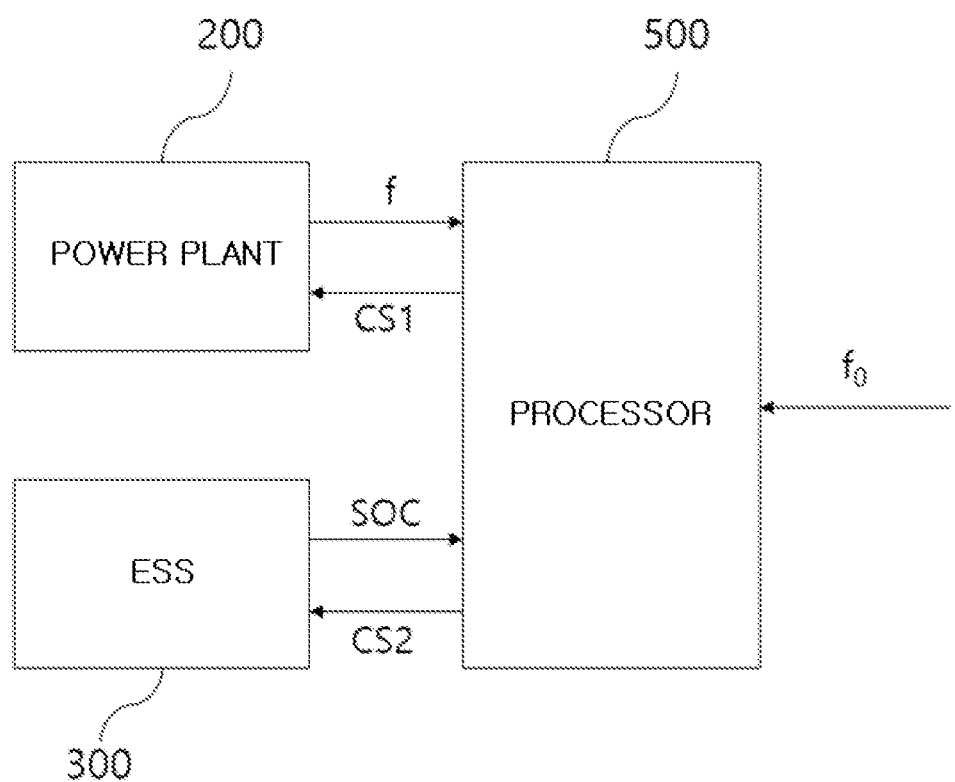
FIG. 3 is a view showing a configuration of a frequency control system according to another exemplary embodiment.

FIG. 3 is a view showing a configuration of a frequency control system according to another exemplary embodiment.

Referring to FIG. 3, a frequency control system 2000 according to the exemplary embodiment may include the power plant 200, the ESS 300, and a processor 500.

The processor 500 may receive information on the supply frequency $f_0$ to be supplied to the consumer 400, and compare the information on the supply frequency $f_0$ with information on the reference frequency f. As a result of comparing the supply frequency $f_0$ and the reference frequency f, if the supply frequency $f_0$ is greater than the reference frequency f, the processor 500 may control the power plant 200 and the ESS 300 to reduce the amount of power supplied to the consumer 400.

For example, the processor 500 may transmit a control signal CS1 for controlling the amount of power supplied to the consumer 400 to be reduced to the power plant 200. Upon receiving the control signal CS1 from the processor 500, the power plant 200 may reduce the amount of power generated or reduce the amount of power supplied to the consumer 400.

Further, the processor 500 may transmit a control signal CS2 for controlling the amount of power supplied to the consumer 400 to be reduced to the ESS 300. Upon receiving the control signal CS2 from the processor 500, the ESS 300 may reduce the amount of power supplied to the consumer 400.

Meanwhile, as a result of comparing the supply frequency $f_0$ and the reference frequency f, if the supply frequency $f_0$ is less than the reference frequency f, the processor 500 may control the power plant 200 and the ESS 300 to increase the amount of power supplied to the consumer 400.

For example, the processor 500 may transmit the control signal CS1 for controlling the amount of power supplied to the consumer 400 to be increased to the power plant 200. Upon receiving the control signal CS1 from the processor 500, the power plant 200 may increase the amount of power generated or increase the amount of power supplied to the consumer 400.

Also, the processor 500 may transmit a control signal CS2 for controlling the amount of power supplied to the consumer 400 to be increased to the ESS 300. Upon receiving the control signal CS2 from the processor 500, the ESS 300 may increase the amount of power supplied to the consumer 400.

However, if the charge amount of the ESS 300 is less than or equal to the reference charge amount, the power stored in the ESS 300 cannot be supplied to the consumer 400. Accordingly, the processor 500 may receive information on charge amount (SOC) from the ESS 300 and determine whether the received charge amount (SOC) of the ESS 330 is less than or equal to the reference charge amount. If the received charge amount (SOC) of the ESS 330 is less than or equal to the reference charge amount, the processor 500 may increase the amount of power supplied to the consumer 400 by controlling the power plant 200.

That is, the processor 500 may transmit the control signal CS1 for controlling the opening degree of the steam valve 210 disposed in the power plant 200 to the power plant 200. Upon receiving the control signal CS1, the power plant 200 may be controlled to reduce the opening degree of the steam valve 210. Accordingly, it is possible to increase the amount of power generated by the power plant 200 by temporarily increasing the flow velocity of the steam and temporarily increasing the amount of the steam. As the amount of power generated by the power plant 200 increases, more power may be supplied to the consumer 400. Accordingly, the supply frequency of the power supplied to the consumer 400 may increase.

The processor 500 may transmit the control signal CS1 for controlling the quantity of fuel injected into the power plant 200 for power generation to the power plant 200. Upon receiving the control signal CS1, the power plant 200 may be controlled to increase the quantity of fuel. Accordingly, the quantity of fuel burned in the combustion unit 220 may be increased, thereby increasing the amount of power generated by the power plant 200. If the amount of power generated by the power plant 200 is increased, more power may be supplied to the consumer 400. Accordingly, the supply frequency of the power supplied to the consumer 400 may increase.

Figure 4:
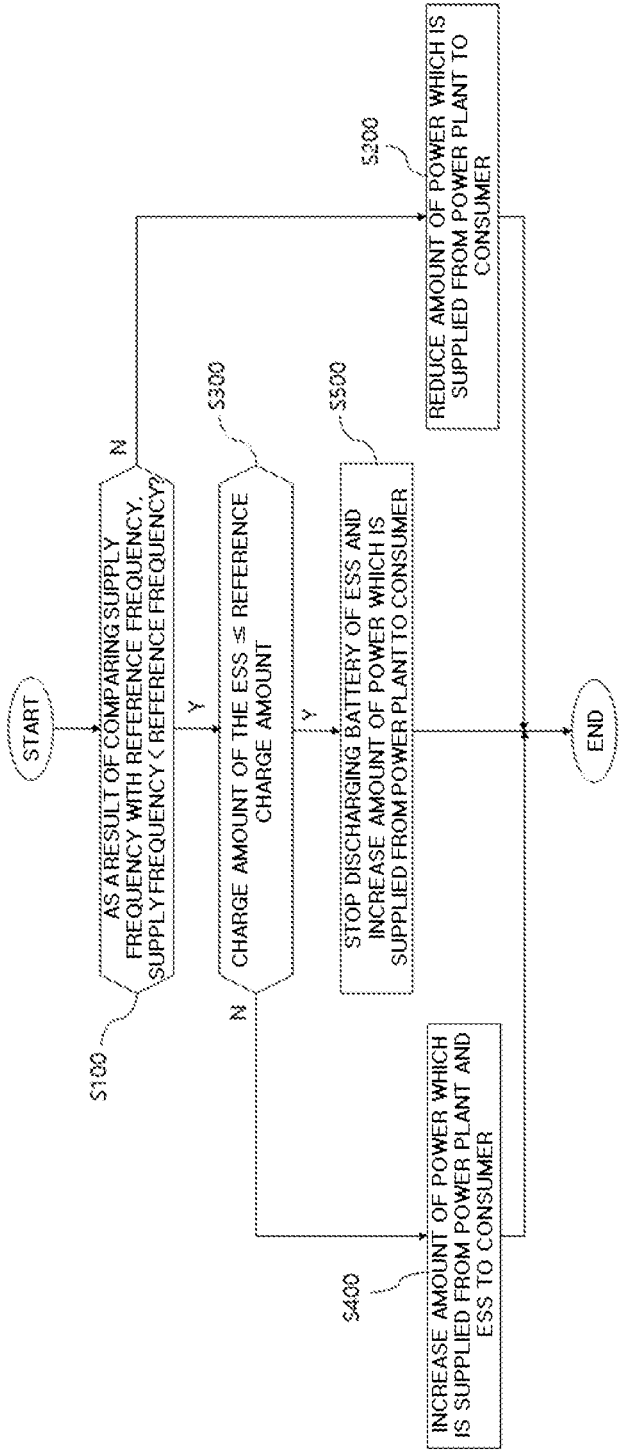
FIG. 4 is a view showing a frequency control method according to an exemplary embodiment.

FIG. 4 is a view showing a frequency control method according to an exemplary embodiment.

Referring to FIG. 4, the controller 110 may compare the supply frequency of the power supplied to the consumer 400 with the reference frequency. As a result of the comparison, the controller 110 may determine whether the supply frequency is less than the reference frequency (operation S100).

If the supply frequency is greater than the reference frequency, the controller 110 may reduce the amount of power supplied from the power plant 200 to the consumer 400 (operation S200). If the supply frequency is greater than the reference frequency, because the power supply is greater than the power demand, the controller 110 controls the supply frequency to decrease by reducing the amount of power supplied from the power plant 200 and the ESS 300 to the consumer 400. Accordingly, the supply frequency of the power supplied to the consumer 400 may be controlled.

Meanwhile, if the supply frequency is less than the reference frequency, the controller 110 may determine whether the charge amount of the ESS 300 is less than or equal to the reference charge amount (operation S300).

If the charge amount of the ESS 300 is greater than the reference charge amount, the controller 110 may increase the amount of power supplied from the power plant 200 and the ESS 300 to the consumer 400 (operation S400). If the supply frequency is less than the reference frequency, because the power demand is greater than the power supply, the controller 110 controls the supply frequency to increase by increasing the amount of power supplied from the power plant 200 and the ESS 300 to the consumer 400. Accordingly, the supply frequency of the power supplied to the consumer 400 may be controlled.

On the other hand, if the charge amount of the ESS 300 is less than or equal to the reference charge amount, the controller 110 may stop discharging a battery of the ESS 300 and increase the amount of power supplied from the power plant 200 to the consumer 400 (operation S500).

If the charge amount of the ESS 300 is less than or equal to the reference charge amount, the power stored in the ESS 300 cannot be supplied to the consumer 400. Accordingly, if the charge amount of the ESS 300 is less than or equal to the reference charge amount, the controller 110 may control an additional power supplied from the power plant 200 to the consumer 400 as much as the amount of power that the ESS 300 cannot supply to the consumer 400. Accordingly, the supply frequency of the power supplied to the consumer 400 may be controlled.

For example, the controller 110 may control the opening degree control device 120 to reduce the opening degree of the steam valve 210. Here, if the opening degree of the steam valve is reduced by the opening degree control device 120, the flow velocity of the steam may be temporarily increased. Accordingly, it is possible to increase the amount of power generated by the power plant 200 by temporarily increasing the amount of steam. If the amount of power generated by the power plant 200 increases, more power may be supplied to the consumer 400. Accordingly, the supply frequency of the power supplied to the consumer 400 may increase.

Also, the controller 110 may control the fuel quantity control device 130 to increase the quantity of fuel injected into the power plant 200 for power generation. Here, if the quantity of fuel is increased by the fuel quantity control device 130, the quantity of fuel burned in the combustion unit 220 increases, thereby increasing the amount of power generated by the power plant 200.

If the amount of power generated by the power plant 200 is increased by the control of the controller 110, more power may be supplied to the consumer 400. Accordingly, the supply frequency of the power supplied to the consumer 400 may increase.

Meanwhile, various methods according to the exemplary embodiment described above may be implemented in the form of a readable program through various computer means and recorded in a computer readable recording medium. Here, the recording medium may include program commands, data files, data structures, and the like alone or in combination thereof. The program commands recorded in the recording medium may be those specially designed and configured for the exemplary embodiment or may also be those known and available to those skilled in the art of computer software. For example, the recording medium includes a hardware device specially configured to store and execute the program commands such as magnetic media such as a hard disk, a floppy disk, and a magnetic tape, optical media such as a CD-ROM and a DVD, magneto-optical media such as a floptical disk, a ROM, a RAM, or a flash memory. Examples of the program command may include a high-level language which may be executed by a computer using an interpreter or the like as well as a machine language wire as produced by a compiler. The hardware device may be configured to operate as one or more software modules in order to perform the operation of the exemplary embodiment, and vice versa.

As described above, according to one or more exemplary embodiments, it is possible to implement the frequency control device which, when the frequency of power supplied to the consumer is less than the reference frequency and when the charge amount of the ESS is less than or equal to the reference charge amount, increases the amount of power supplied to the consumer by controlling at least one of the opening degree of the steam valve and the fuel quantity, thereby increasing the frequency.

While one or more exemplary embodiments have been described with reference to the accompanying drawings, it is to be understood by those skilled in the art that various modifications and changes in form and details can be made therein without departing from the spirit and scope as defined by the appended claims. Therefore, the description of the exemplary embodiments should be construed in a descriptive sense only and not to limit the scope of the claims, and many alternatives, modifications, and variations will be apparent to those skilled in the art.

What is claimed is:

1. A control method of a power generation system comprising an energy storage system (ESS) and a power plant, the control method comprising:
   comparing a supply frequency of a supply power supplied to a consumer with a reference frequency; and
   controlling the supply power in accordance with a result of the frequency comparison,
   wherein the controlling the supply power comprises:
   comparing a charge amount of the ESS with a reference charge amount; and
   controlling an output of the power plant and a discharge amount of the ESS in accordance with a result of the charge amount comparison,
   wherein the controlling the supply power comprises controlling the supply frequency of the supply power by increasing the amount of power generated by the power plant in response to determining that the charge amount of ESS is less than or equal to the reference charge amount and controlling the power plant and the ESS to supply power to the consumer in response to determining that the charge amount of the ESS exceeds the reference charge amount, and
   wherein the controlling the output of the power plant comprises controlling the output of the power plant by controlling at least one of a steam valve disposed in the power plant and a quantity of fuel injected into the power plant.

2. The control method of claim 1, wherein the controlling the supply power comprises decreasing an amount of power supplied to the consumer, in response to determining that the supply frequency is greater than the reference frequency.

3. The control method of claim 2, wherein the controlling the output of the power plant and the discharge amount of the ESS comprises controlling the output of the power plant to be reduced, in response to determining that the charge amount of the ESS is greater than the reference charge amount.

4. The control method of claim 2, wherein the controlling the output of the power plant and the discharge amount of the ESS comprises controlling the ESS to be charged by using the output of the power plant, in response to determining that the charge amount of the ESS is less than or equal to the reference charge amount.

5. The control method of claim 1, wherein the controlling the supply power comprises increasing an amount of power supplied to the consumer, in response to determining that the supply frequency is less than the reference frequency.

6. The control method of claim 5, wherein the controlling the output of the power plant and the discharge amount of the ESS comprises controlling power of at least one of the output of the power plant and the discharge amount of the ESS to be increased, in response to determining that the charge amount of the ESS is greater than the reference charge amount.

7. The control method of claim 5, wherein the controlling the output of the power plant and the discharge amount of the ESS comprises controlling the output of the power plant to be increased and controlling the discharge amount of the ESS to be 0, in response to determining that the charge amount of the ESS is less than or equal to the reference charge amount.

8. The control method of claim 7, wherein the controlling the output of the power plant to be increased comprises controlling an opening degree of the steam valve to be increased or controlling the quantity of fuel to be increased.

9. A control device for a power generation system comprising an energy storage system (ESS) and a power plant, the control device comprising:
a controller configured to compare a supply frequency of a supply power supplied to a consumer with a reference frequency, compare a charge amount of the ESS with a reference charge amount, and control the ESS and the power plant such that the supply power is controlled according to a result of the frequency comparison and a result of the charge amount comparison;
an opening degree control device configured to control an opening degree of a steam valve disposed in the power plant by the control of the controller; and
a fuel quantity control device configured to control a quantity of fuel injected into the power plant for power generation by the control of the controller,
wherein the controller controls the supply frequency of the supply power by increasing the amount of power generated by the power plant in response to determining that the charge amount of the ESS is less than or equal to the reference charge amount and controls the power plant and the ESS to supply power to the consumer in response to determining that the charge amount of the ESS exceeds the reference charge amount.

10. The control device of claim 9, wherein the controller controls the ESS and the power plant to reduce an amount of power supplied to the consumer, in response to determining that the supply frequency is greater than the reference frequency.

11. The control device of claim 10, wherein the controller controls an output of the power plant to be reduced, in response to determining that the charge amount of the ESS is greater than the reference charge amount.

12. The control device of claim 10, wherein the controller controls the ESS to be charged by using an output of the power plant, in response to determining that the charge amount of the ESS is less than or equal to the reference charge amount.

13. The control device of claim 9, wherein the controller controls the ESS and the power plant to increase an amount of power supplied to the consumer, in response to determining that the supply frequency is less than the reference frequency.

14. The control device of claim 13, wherein the controller controls power of at least one of an output of the power plant and a discharge amount of the ESS to increase, in response to determining that the charge amount of the ESS is greater than the reference charge amount.

15. The control device of claim 13, wherein the controller controls an output of the power plant to increase and controls a discharge amount of the ESS to be 0, in response to determining that the charge amount of the ESS is less than or equal to the reference charge amount.

16. The control device of claim 15, wherein the controller controls the opening degree control device to increase the opening degree of the steam valve or controls the fuel quantity control device to increase the quantity of fuel.

17. A frequency control system comprising:
an energy storage system (ESS);
a power plant configured to generate a supply power supplied to a consumer;
a processor configured to:
compare a supply frequency of the supply power supplied to the consumer with a reference frequency;
compare a charge amount of the ESS with a reference charge amount; and
control the ESS and the power plant to output power based on a frequency comparison result and a charge amount comparison result,
wherein the processor controls the supply frequency of the power supply by increasing the amount of power generated by the power plant in response to determining that the charge amount of the ESS is less than or equal to the reference charge amount and controls the power plant and the ESS to supply power to the consumer in response to determining that the charge amount of the ESS exceeds the reference charge amount.

18. The frequency control system of claim 17, wherein the processor controls the ESS and the power plant to reduce an amount of power supplied to the consumer by transmitting control signals for controlling the amount of power to the ESS and the power plant, respectively, in response to determining that the supply frequency is greater than the reference frequency.

19. The frequency control system of claim 17, wherein the processor controls the ESS and the power plant to increase an amount of power supplied to the consumer by transmitting control signals for controlling the amount of power to the ESS and the power plant, respectively, in response to determining that the supply frequency is less than the reference frequency.

20. The frequency control system of claim 17, wherein the processor controls the power plant to increase an amount of power supplied to the consumer and controls the ESS to be charged using an output of the power plant, in response to determining that the charge amount of the ESS is less than or equal to the reference charge amount.

* * * * *